June 7, 1960 C. C. BAUERLEIN 2,939,298
SELF-RELEASING ICE MOLD
Filed June 9, 1958 2 Sheets-Sheet 2
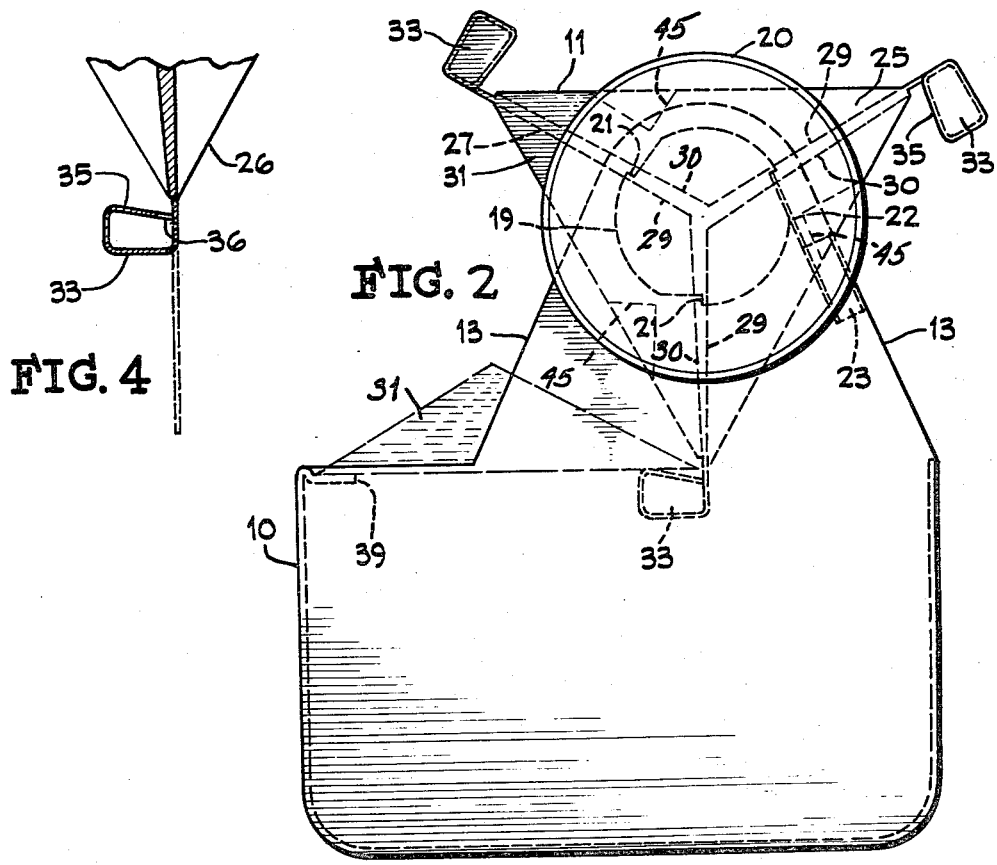
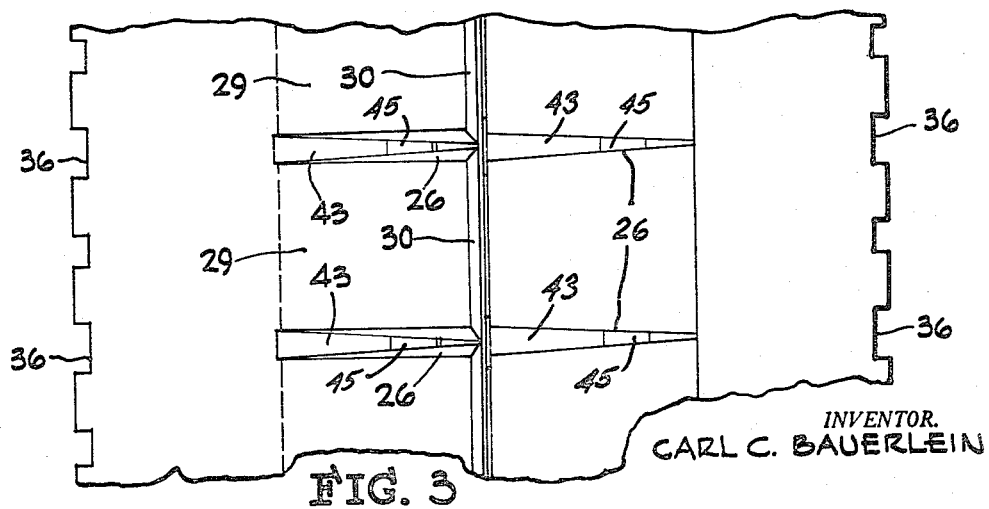
INVENTOR.
CARL C. BAUERLEIN
BY *Hill, Sherman, Meroni, Gross & Simpson* ATTORNEYS

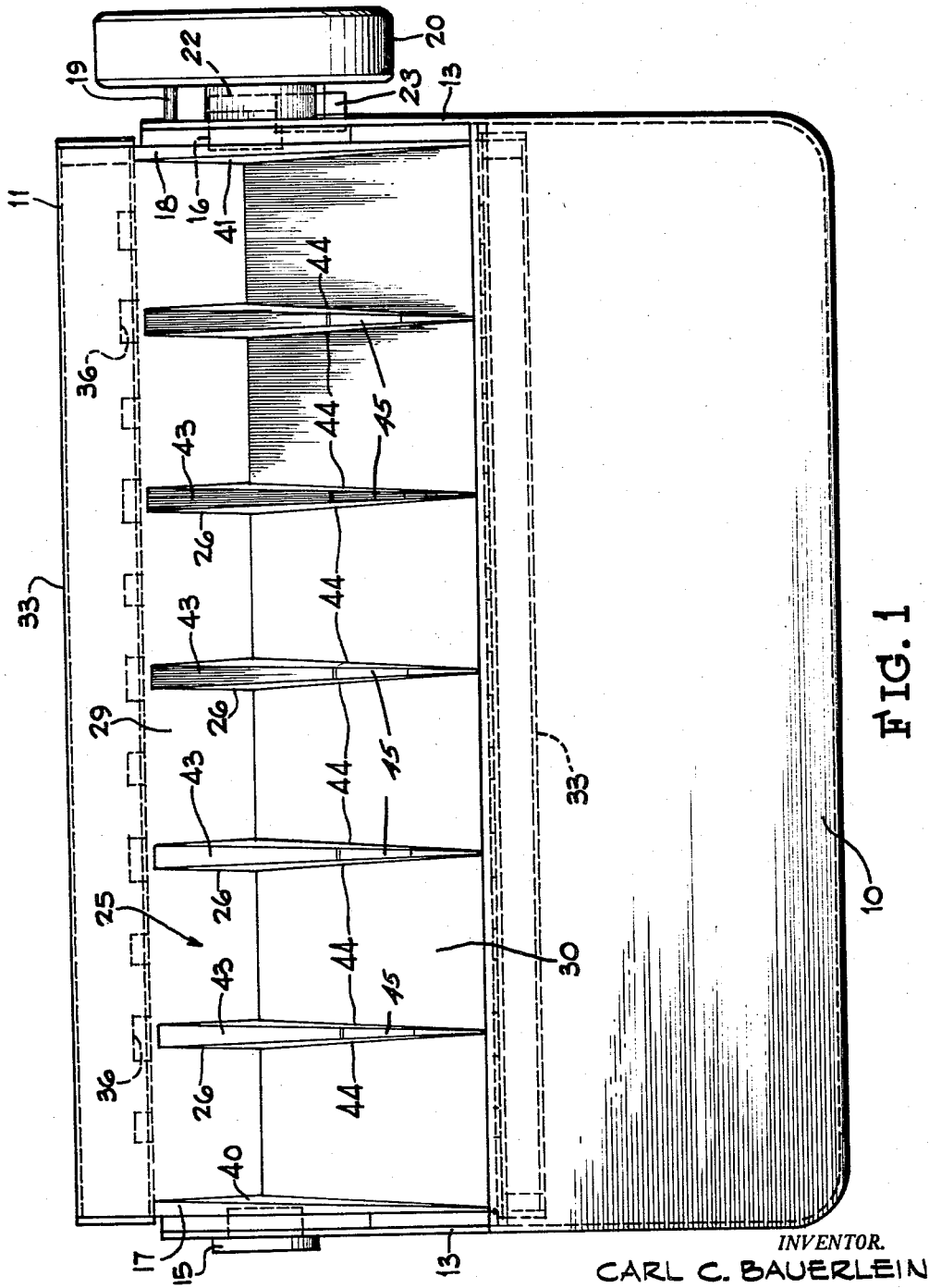

United States Patent Office 2,939,298
Patented June 7, 1960

2,939,298

SELF-RELEASING ICE MOLD

Carl C. Bauerlein, Lincolnwood, Ill., assignor to The Dole Valve Company, Morton Grove, Ill., a corporation of Illinois Filed June 9, 1958, Ser. No. 740,898

15 Claims. (Cl. 62—344)

This invention relates to improvements in receptacles or trays for freezing ice and the like, and more particularly relates to a self-releasing ice mold.

A principal object of the invention is to provide a novel and efficient form of receptacle for freezing ice in the freezing compartments of refrigerators and the like in which the frozen ice is released by the heat of the water filling the mold for a next succeeding freezing operation.

A further object of the invention is to provide a mold for ice cubes and the like in which the mold is rotatable about a horizontal axis and has multiple ice molds facing outwardly from the axis of rotation of the molds, in which the walls of the molds being filled with water have heat transfer relation with respect to the walls of the molds containing frozen ice pieces therein, to effect the release of the frozen ice pieces in one set of molds by the heat of the water filling another upwardly facing set of molds.

A still further object of the invention is to provide a rotatable receptacle for freezing ice cubes and the like having at least three molds spaced 120° apart and in heat transfer relationship with respect to each other through radial dividing walls, common to each of two molds, having means collecting the water dripping from the ice pieces when released by the heat of the water filling an upwardly facing mold and returning the water to the mold when turned to a filling position.

A still further object of the invention is to provide a self-releasing ice mold for ice makers and the like having at least three molds defined by radial walls spaced 120° apart, in which each mold is provided with spaced partitions, dividing the molds in a plurality of individual molds for freezing the ice in the form of prisms, and in which the partitions are so tapered as to form the molds to diverge outwardly from the bottom of the mold to the top when the mold is in a water receiving position, and to diverge outwardly from the top to the bottom of the mold when the mold is in an ice releasing position, whereby the heat of the water filling an outwardly facing mold effects the release of the ice pieces in a downwardly facing mold by the heat transfer through the walls thereof.

A still further object of the invention is to provide a rotatable ice mold having three molds spaced substantially 120° apart and in heat transfer relationship with respect to each other through radial walls common to each of two molds, and having drip troughs extending along the outer edges of the radial walls for collecting the water dripping from a thawing ice piece released by the heat of the water filling an upwardly facing mold, and returning the thawing water to the mold when in an upwardly facing filling position.

Still another object of the invention is to provide a novel form of rotatable ice cube mold having multiple oppositely facing molds and having at least two walls common to two other molds, with drip retaining troughs extending along the outer edges of the walls in position to receive the water dripping from the ice pieces when released from the molds by thawing by the heat of the water filling an upwardly facing mold, in which the drip retainers are so arranged as to retain the ice pieces when released in position to effect refreezing of the thawed surfaces thereof.

Still another object of the invention is to provide an ice storage basket and rotatable multiple ice mold having a plurality of oppositely facing molds in which the heat of the water filling the molds releases ice pieces from the adjacent downwardly facing mold, in which the storage basket has a refreezing support cooperating with the mold to hold the released ice piece from falling to the storage basket, to effect refreezing of the melted surfaces thereof.

A still further object of the invention is to provide a rotatable self-releasing ice mold in which the ice is frozen in the form of prisms and is released by rotation thereof from the molds by the release of the bond of the prisms to the molds by thawing by the heat of the water filling an upwardly facing mold, and are retained when released from the mold to dry the wetted surfaces thereof by freezing, prior to being discharged to storage.

These and other objects of the invention will appear from time to time as the following specification proceeds and with reference to the accompanying drawings wherein:

Figure 1 is a view in side elevation of a rotatable ice mold and storage basket constructed in accordance with the invention;

Figure 2 is an end view of the ice storage basket and mold shown in Figure 1;

Figure 3 is an enlarged bottom plan view of the ice mold showing the angular structures of the partitions dividing the molds to freeze the ice into individual prisms; and Figure 4 is an enlarged fragmentary sectional view illustrating the detail structure of a drip retainer for collecting the drops of melted ice falling from the ice cubes, during release thereof.

In the embodiment of the invention illustrated in the drawings, I have shown in Figures 1 and 2 a storage basket 10 for frozen ice cubes or blocks. The storage basket 10 is shown as being of a generally rectangular form, having an open top having a rotatable freezing receptacle or ice tray 11 extending therealong and mounted thereabove, on extensions or ears 13 extending upwardly from opposite end walls of said storage basket.

The receptacle 11 may be made from a material having a high heat conductivity with the ability to readily release the ice when warmed, such as die cast or extruded aluminum, copper, or copper clad with stainless steel or various other similar materials.

The freezing receptable or tray 11 is shown as being generally triangular in form having three ice molds 25 spaced 120° apart, and is rotatably mounted concentric with the center thereof on studs 15 and 16 extending inwardly from the ears 13. The studs 15 and 16 are shown as being rotatably mounted in the ears 13, and as being secured at their inner ends to end walls 17 and 18 respectively, of the mold or receptacle 11.

The stud 16 extends outwardly of its support ear 13, and is shown as having an indexing ratchet wheel 19 mounted thereon. A knob 20 is mounted on said stud 16 outwardly of said indexing ratchet wheel. The indexing ratchet wheel 19 is shown as having three notches or ratchet teeth 21, spaced 120° apart and engaged by a flat spring 22, extending from a U-shaped spring clip 23 holding the receptacle for rotation in one direction only. The spring clip 23 is suitably mounted on the ear 13, to bias the leaf spring 22 into engagement with the ratchet wheel 19 to engage a notch 21 as the knob 20 and mold 25 are turned in a counterclockwise direction from a filling and freezing position into a downwardly facing discharge position, and to hold the receptacle from being turned in a clockwise direction.

The molds 25 are partitioned to provide a series of individual prism like molds, by partitions or dividers 26, extending thereacross between radial walls 27, extending from the center of the receptacle and connected between the end walls 17 and 18. Each radial wall 27 has an advance face 29 facing in the direction of rotation of the mold, which is shown as being generally parallel to a radial line extending from the center of the receptacle. Each wall 27 also has a retreating face 30 facing oppositely from the direction of rotation of the mold and extending at an angle with respect to a radial line extending through the center of the receptacle, and inclined from the center of the receptacle toward the face 29 to provide a tapered wall and a release face, tilted with respect to the vertical, to facilitate the release of ice prisms 31 from the molds, as the surfaces of the prisms extending along the faces 29 and 30 are melted by the heat transferred thereto, by the heat of the water filling an upwardly facing mold 25.

The walls 27 are shown in Figure 3 as extending beyond the ends of the end walls 17 and 18. The outwardly extending portions of the walls 27 may be formed by bending into troughs or drip retainers 33, closed at their ends. The drip retainers 33 are provided to collect the drops of water dropping from the thawing surfaces of the ice prisms as the ice prisms are released by the heat of the water filling the upwardly facing molds 25, and to return the water to the mold when the mold is turned to a filling position, and the heat of the water filling the mold thaws the frozen water in the drip retainer. As herein shown, each drip retainer 33 has an inwardly turned wall 35, which is notched as indicated by reference character 36, to accommodate the drops of water flowing from the ice prisms to drip thereinto.

While the drip retainers 33 are shown as being formed by bending, they may be cast in the form shown or may be formed separately of the walls 27 and be attached thereto.

The drip retainers 33 also cooperate with an inwardly extending refreeze ledge 39, extending inwardly from the upper wall of the storage basket 10, to support the ice prism during freezing of the water in an upwardly facing mold and to accommodate the surface of the prism to dry by freezing as the water in an upwardly facing ice mold freezes, prior to the discharge of the prism into the storage basket 10. As the water freezes in an upwardly facing mold 25 and the receptacle is turned to bring an empty mold into position to be filled with water, the ice prisms 21 will be reelased from the drip retainers 33 to fall into the storage basket 10.

As shown in Figure 1, the end walls 17 and 18 are tapered outwardly from the center of the mold and are also tapered from the top to the bottom of the mold, when the mold is in the discharge position shown in Figures 1 and 2, as indicated by reference characters 40 and 41, respectively.

The partitions or dividers 26, spaced between the end walls 17 and 18 are also tapered in two directions, to provide individual ice prism molds tapering outwardly from the base to the outer ends of the molds, to facilitate the release of the ice blocks by gravity when one mold 25 is in a vertically extending release position and the upwardly facing mold 25 is being filled with water; to melt the surfaces of the frozen ice prisms extending along the faces 29 and 30 of the walls 27 and along the dividers 26.

As shown in Figures 1 and 3, each divider 26 has an outer triangular face 43, the base of which is adjacent the outer end of the face 29 of the wall 27 and the apex of which is at the lower end of the face 30 of the wall 27, when said face is extending in a generally vertical direction.

The opposite side walls of each divider 26 also taper inwardly from the center of the mold, as they extend along the divider 26, as indicated by reference characters 44, the taper of which is the same as the taper of the inner faces 40 and 41 of the respective end walls 17 and 18 of the mold.

All of the walls of the individual molds thus taper inwardly and downwardly when the mold is in an ice release position, to provide ice prism molds diverging outwardly and downwardly, to readily release the ice upon breaking of the bond between the walls of the individual molds and the ice prisms by the melting of the ice prisms along the walls of the molds.

The dividers 26 have notches 45 recessed in the outer faces 43 thereof. Said notches are herein shown as being V-shaped and accommodate the flow of water from one compartment to the other during filling of the molds. After freezing of the water in the molds, the frozen portions of the ice prisms extending through the notches 45 serve to connect the ice prisms together as a composite mass. As the ice prisms are released by thawing by filling the upwardly facing molds with water, the composite mass will slide downwardly along the downwardly facing mold and the surfaces of the notches will act as cams engaging the connecting pieces between the ice prisms, to cam the ice prisms away from the surfaces 30 and to thereby aid in the ejection of the ice prisms from their molds.

It may be seen from the foregoing that the faces 29 and 30 of the walls 27, the inner faces 40 of the end walls 17 and 18 and the facing faces of the dividers or partitions 26 are so formed as to provide individual ice prism molds, all of the walls of which diverge outwardly and downwardly when the particular mold has been turned 120° to a position to release an ice prism by thawing the surfaces thereof, and that the water dripping from the thawing faces of the cubes is collected and frozen when the particular mold is in an ice release position, and is thawed and returned to the mold when the mold is in a filling position.

It may further be seen that the particular mold formation shown is such as not only to provide surfaces readily releasing the ice prisms from the mold, but also to provide a rapid heat transfer between the molds, accommodating the water filling an upwardly facing mold to release frozen ice blocks from a next adjacent downwardly facing mold spaced in a counterclockwise direction from the upwardly facing mold, to drop onto the drip retainer 33 and then pivot into engagement with the ledge 39 and be supported on said drip retainer and ledge to dry the wetted surface thereof by freezing, as the water in the upwardly facing mold freezes.

It should further be understood that while for the purpose of simplicity, I have shown a knob for positioning the mold in its filling and release positions, that the mold maybe turned by power under the control of a cycle control system and may be installed as a unitary part of a refrigerator.

It will be understood that various modifications and variations in the present invention may be effected without departing from the spirit and scope of the novel concepts thereof.

I claim as my invention:

1. In a rotatable ice freezing receptacle, a plurality of oppositely facing ice molds having drip retainers extending therealong for collecting the water dripping from the ice as the bond between the ice and mold is broken by thawing, accommodating the water to freeze therein during freezing of a next succeeding batch of ice and returning the water to the empty mold upon turning of the mold to a filling position and upon thawing of the frozen water therein by the heat of the water filling the mold.

2. In an ice freezing receptacle, a rotary mold having three radial walls extending radially from the axis of rotation thereof, and forming three molds, two radial walls of which are in heat transfer relation with respect to two other molds, and drip retainers extending along the outer edges of said walls for collecting the water dropping from the ice as the bond between the ice and mold is broken by thawing, accommodating the collected water to freeze therein during freezing of a next succeeding batch of ice, and returning the collected and frozen water to an empty mold upon rotation of the empty mold in position to be filled with water and the filling of the empty mold with water.

3. In an ice maker, an ice storage basket, a rotary multiple ice freezing receptacle having a plurality of oppositely facing ice molds, the transfer of the heat of the water filling one mold providing the heat to thaw the surfaces of ice pieces in the downwardly facing molds and release the ice pieces to fall therefrom by gravity, and abutment means on said receptacle, disposed beneath the downwardly facing molds when in an ice releasing position and engaging the releasing ice pieces to effect pivotal movement thereof by gravity onto said basket, to retain the ice pieces above said basket to accommodate drying of the wetted surfaces thereof by freezing, prior to the discharge of the ice pieces into said basket and releasing the dried ice pieces to drop into said basket by gravity by rotation of the downwardly facing molds toward a filling position.

4. In an ice maker, an ice storage basket, a rotary multiple ice freezing receptacle having a plurality of oppositely facing ice molds, the transfer of the heat of the water filling one mold providing the heat to thaw the surfaces of ice pieces in the downwardly facing molds and release the ice pieces to fall therefrom by gravity, and a drip retainer extending along each mold, collecting the water dripping from the thawing surfaces of the releasing ice, and returning the collected water to the associated empty mold, upon turning the mold to a filling position and the filling of the empty mold with water.

5. In an ice maker, an ice storage basket, a rotary multiple ice freezing receptacle having a plurality of oppositely facing ice molds, the transfer of the heat of the water filling one mold providing the heat to thaw the surfaces of ice pieces in the downwardly facing molds and release the ice pieces to fall therefrom by gravity, and a drip retainer extending along each mold, collecting the water dripping from the thawing surfaces of the releasing ice, and returning the collected water to the associated empty mold, upon turning the mold to a filling position and the filling of the empty mold with water, said drip retainers also forming abutment means engaging the releasing ice to effect pivotal movement thereof by gravity onto said basket and to retain the ice above said basket to accommodate drying of the wetted surfaces thereof by freezing, prior to the discharge of the ice into said basket.

6. In an ice maker, an ice storage basket having an open top, a rotary multiple freezing mold, means mounting said mold above the top of said basket for rotation about an axis extending longitudinally thereof, said freezing mold having a plurality of oppositely facing ice molds so arranged with respect to each other as to effect the release of ice pieces from the downwardly facing molds by the heat transfer of the water filling the upwardly facing molds, drip troughs extending along said molds positioned along the bottoms thereof when said molds are positioned in a vertically extending release position, and collecting the water dripping from the melted faces of the ice pieces and returning the water to the empty molds upon the rotation of the mold to a filling position, and means on said storage basket engaged by the falling ice blocks and retaining the ice pieces to said drip retainers, to effect drying of the wetted surface thereof by freezing prior to the discharge of the ice pieces into said storage basket.

7. In an ice maker, an ice storage basket, a rotatable mold disposed above said basket, means mounting said mold in vertically spaced relation with respect to the top of said basket for rotation about an axis extending longitudinally of said basket, said mold having a plurality of ice prism molds spaced 120° apart and in heat transfer relationship with respect to each other through the walls of the molds, means indexing said molds to position one mold in an upwardly facing position for filling and to position another mold in a vertically extending downwardly facing position for the discharge of ice prisms therefrom by thawing, by the heat of the water filling the upwardly facing mold, drip retainers extending along said molds in position to collect water dripping from the thawing faces of the ice prisms and to return the water to the empty mold upon turning of the mold to a filling position, said drip retainers engaging the dropping ice prisms upon release from the molds, and means on said basket cooperating with said drip retainers for retaining the ice prisms to said drip retainers in spaced relation with respect to the bottom of the basket for drying the wetted surfaces thereof by freezing prior to the release of the ice prisms into said basket.

8. In an ice freezing receptacle, a rotary mold having three radially extending walls and spaced 120° apart, end walls connecting said walls together, partitions spaced along said radial walls generally perpendicular to the axis of rotation thereof, the inner faces of said end walls having outwardly tapering surfaces and said partitions converging in the direction of rotation of said molds from the rearwardmost radial wall to the forwardmost radial wall and from the center of the molds to the outersides thereof.

9. In a multiple ice freezing receptacle of a type in which the ice drops by gravity, upon breaking its bond with the mold by the heat of the water filling an empty mold, a rotary receptacle having three radial walls extending from the axis of rotation thereof and spaced 120° apart, end walls connecting said walls together, partitions spaced along said walls and with said end walls dividing the space between said walls into a series of ice prism molds, each radial wall having one face facing in the direction of rotation thereof and extending generally parallel to a radial line extending through the center of the mold and having an opposite face tapering inwardly from the center of the mold toward the opposite end of said radial wall, and thereby providing an outwardly inclined generally vertically extending release face when the mold is in a vertical discharge position, and said partitions converging inwardly and downwardly when the mold is in a vertical discharge position and providing ice prism molds diverging outwardly and downwardly, to accommodate the release of ice prisms from the mold by gravity by breaking the bond thereof with the mold by the heat of filling an empty mold with water.

10. In an ice freezing receptacle, a rotary mold having three radially extending walls and spaced 120° apart, end walls connecting said walls together, partitions spaced along said radial walls generally perpendicular to the axis of rotation thereof, the inner faces of said end walls having outwardly tapering surfaces and said partitions converging in the direction of rotation of said molds from the rearwardmost radial wall to the forwardmost radial wall and from the center of the molds to the outersides thereof, and drip retainers extending along the outer end of said radial walls and collecting water dripping from said ice prisms during the release thereof and returning the collected water upon turning of an empty mold to a filling position.

11. In an apparatus of the class described, an ice storage basket having an open top, a multiple mold ice receptacle disposed above said basket and mounted for rotation with respect thereto to discharge ice released from said mold into said storage basket, said mold having at least three radial walls spaced 120° apart and having partitions spaced between said walls forming multiple outwardly facing molds, means indexing said molds to position one mold in an upwardly facing filling position and another mold in a downwardly facing release position, to accommodate release thereof by gravity by breaking the bond between the ice pieces and molds by thawing by the heat of the water filling an upwardly facing mold, and drip retainers extending along the ends of said radial walls, collecting the water dripping from the releasing ice and engaging a releasing ice piece and retaining the piece to pivot and rest on the top of said basket to effect the drying of the wetted surfaces thereof by freezing prior to the discharge of the ice piece into said basket for storage.

12. In an apparatus of the class described, an ice storage basket having an open top, a multiple mold ice receptacle mounted on said basket in vertically spaced relation with respect to the top thereof for rotation about an axis extending longitudinally of said basket, said receptacle having at least three radial walls spaced 120° apart having dividers connected between said walls, said walls and dividers converging toward their outer ends and forming ice prism molds diverging outwardly and downwardly when the molds are rotated to a generally vertical releasing position, means retaining said mold for rotation in one direction only indexing said mold to position one mold in an upwardly facing filling position and another mold in the generally vertical downwardly facing release position to effect the release of ice prisms therefrom by gravity by breaking the bonds thereof with the mold by the heat transfer through said radial walls by the filling of the upwardly facing mold with water, a ledge extending along the top of said basket and facing the molds in their release positions, and drip retainers extending along the outer ends of said radial walls engaged by the released ice prisms and effecting the pivoting of the ice prisms by gravity into engagement with said ledge to be retained thereon to effect the drying of the wetted surfaces thereof by freezing upon the freezing of water in the upwardly facing molds and collecting water dripping from the melting surfaces of the ice prisms for freezing therein, and returning the water to the empty mold when in a filling position.

13. In an ice freezing receptacle, a rotary mold having three radially extending walls spaced 120° apart, end walls connecting said walls together, partitions spaced along said radial walls generally perpendicular to the axis of rotation thereof and dividing said mold into individual mold compartments, the inner faces of said end walls having outwardly tapering surfaces and said partitions converging in the direction of rotation of said molds from their rearwardmost radial walls of the forwardmost radial wall and from the center of the molds to the outer sides thereof, and notches in said partitions opening to the outer faces thereof to accommodate the flow of water from one compartment to another, said notches being generally V-shaped and cooperating with the frozen water therein to cam the ice in said mold compartments away from the surfaces thereof upon release of the ice by thawing.

14. In a multiple ice freezing receptacle of a type in which the ice drops by gravity upon breaking its bond with the mold by the heat of the water filling an empty mold, a rotary receptacle having three radial walls extending from the axis of rotation thereof and spaced 120° apart, end walls connecting said walls together, partitions spaced along said walls and with said end walls dividing the space between said walls into a series of ice prism molds, each radial wall having one face facing in the direction of rotation thereof and extending generally parallel to a radial line extending through the center of the mold and having an opposite face tapering inwardly from the center of the mold toward the opposite end of said radial wall and thereby providing an outwardly inclined generally vertically extending release face when the mold is in a vertical discharge position, said partitions converging inwardly and downwardly when the mold is in a vertical discharge position and providing ice prism molds diverging outwardly and downwardly, to accommodate the release of ice prisms from the mold by gravity by breaking the bond thereof with the mold by the heat of filling an empty mold with water, and said partitions having notches therein opening to the outer faces thereof to accommodate the flow of water from one ice prism mold to another, and cooperating with the frozen water therein to cam the connected ice prisms away from the vertical surface of the associated radial wall and aiding in the ejection of the ice prisms from their molds.

15. A rotatable ice freezing receptacle comprising a plurality of oppositely facing ice molds having at least three radially extending walls, end walls connecting said walls together, partitions spaced along said radially extending walls generally perpendicular to the axis of rotation of said receptacle, the inner faces of said end walls having outwardly tapering surfaces and said partitions converging in the direction of rotation of said molds from the rearwardmost radial wall to the forwardmost radial wall and from the center of the molds to the outsides thereof.

References Cited in the file of this patent
UNITED STATES PATENTS

| | | |
|---|---|---|
| 2,407,058 | Clum | Sept. 3, 1946 |
| 2,771,749 | Miller | Nov. 27, 1956 |
| 2,778,198 | Heath | Jan. 22, 1957 |